United States Patent
Nakamura et al.

(10) Patent No.: US 9,560,302 B2
(45) Date of Patent: Jan. 31, 2017

(54) IMAGING APPARATUS HAVING COMPARATOR CONFIGURED TO COMPARE PIXEL SIGNAL WITH REFERENCE SIGNAL THAT CHANGES WITH TIME

(71) Applicant: CANON KABUSHIKI KAISHA, Tokyo (JP)

(72) Inventors: Kohichi Nakamura, Kawasaki (JP); Yasuji Ikeda, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 17 days.

(21) Appl. No.: 14/313,102

(22) Filed: Jun. 24, 2014

(65) Prior Publication Data
US 2015/0042856 A1 Feb. 12, 2015

(30) Foreign Application Priority Data
Aug. 12, 2013 (JP) .................... 2013-167499

(51) Int. Cl.
*H04N 5/378* (2011.01)
*H04N 5/376* (2011.01)

(52) U.S. Cl.
CPC ........... *H04N 5/378* (2013.01); *H04N 5/376* (2013.01)

(58) Field of Classification Search
CPC ............ H04N 5/376; H04N 2201/04767; H04N 2201/04768; H04N 2201/04775; H04N 2201/04772; H04N 21/4424; H04N 17/04; H04L 12/08; G06M 3/00; H03K 3/84; G06F 11/30; H04H 60/32; H03L 7/18; H03L 7/22; H03L 7/20

USPC ........................................... 348/297
See application file for complete search history.

(56) References Cited

U.S. PATENT DOCUMENTS

| | | | |
|---|---|---|---|
| 8,253,809 B2 * | 8/2012 | Nishi | H03M 1/123 341/126 |
| 8,654,230 B2 * | 2/2014 | Wakabayashi | H04N 5/335 348/241 |
| 8,692,920 B2 | 4/2014 | Hiyama et al. | |
| 8,969,771 B2 | 3/2015 | Ikeda et al. | |
| 2009/0027533 A1 * | 1/2009 | Itakura | H04N 5/235 348/308 |
| 2009/0109315 A1 * | 4/2009 | Taura | H04N 5/378 348/311 |
| 2010/0053399 A1 * | 3/2010 | Nishi | H03M 1/123 348/308 |
| 2011/0001039 A1 * | 1/2011 | Hoshino | H03M 1/144 250/208.1 |
| 2011/0114827 A1 * | 5/2011 | Yamaoka | H03K 4/026 250/214 R |

(Continued)

FOREIGN PATENT DOCUMENTS

| | | |
|---|---|---|
| JP | 2002-232291 A | 8/2002 |
| JP | 2008-136043 A | 6/2008 |
| JP | 2011-166733 A | 8/2011 |

*Primary Examiner* — Pritham Prabhakher
(74) *Attorney, Agent, or Firm* — Fitzpatrick, Cella, Harper & Scinto

(57) ABSTRACT

An imaging apparatus includes: a pixel configured to generate a signal through photoelectric conversion; a comparator configured to compare a signal generated by the pixel with a first reference signal that changes with time; and a control unit configured to change the rate of change of the first reference signal with respect to time according to a comparison result of the comparator.

17 Claims, 8 Drawing Sheets

(56) References Cited

U.S. PATENT DOCUMENTS

| | | | |
|---|---|---|---|
| 2012/0008028 A1* | 1/2012 | Egawa | H04N 5/378 348/300 |
| 2012/0194718 A1* | 8/2012 | Sato | H04N 5/357 348/301 |
| 2012/0211643 A1 | 8/2012 | Ikeda et al. | |
| 2012/0305752 A1* | 12/2012 | Shimizu | H04N 5/3577 250/208.1 |
| 2013/0088628 A1* | 4/2013 | Itano | H04N 5/3658 348/308 |
| 2013/0258131 A1* | 10/2013 | Hashimoto | H04N 5/225 348/222.1 |
| 2014/0117202 A1* | 5/2014 | Yoon | H03K 21/10 250/206 |

* cited by examiner

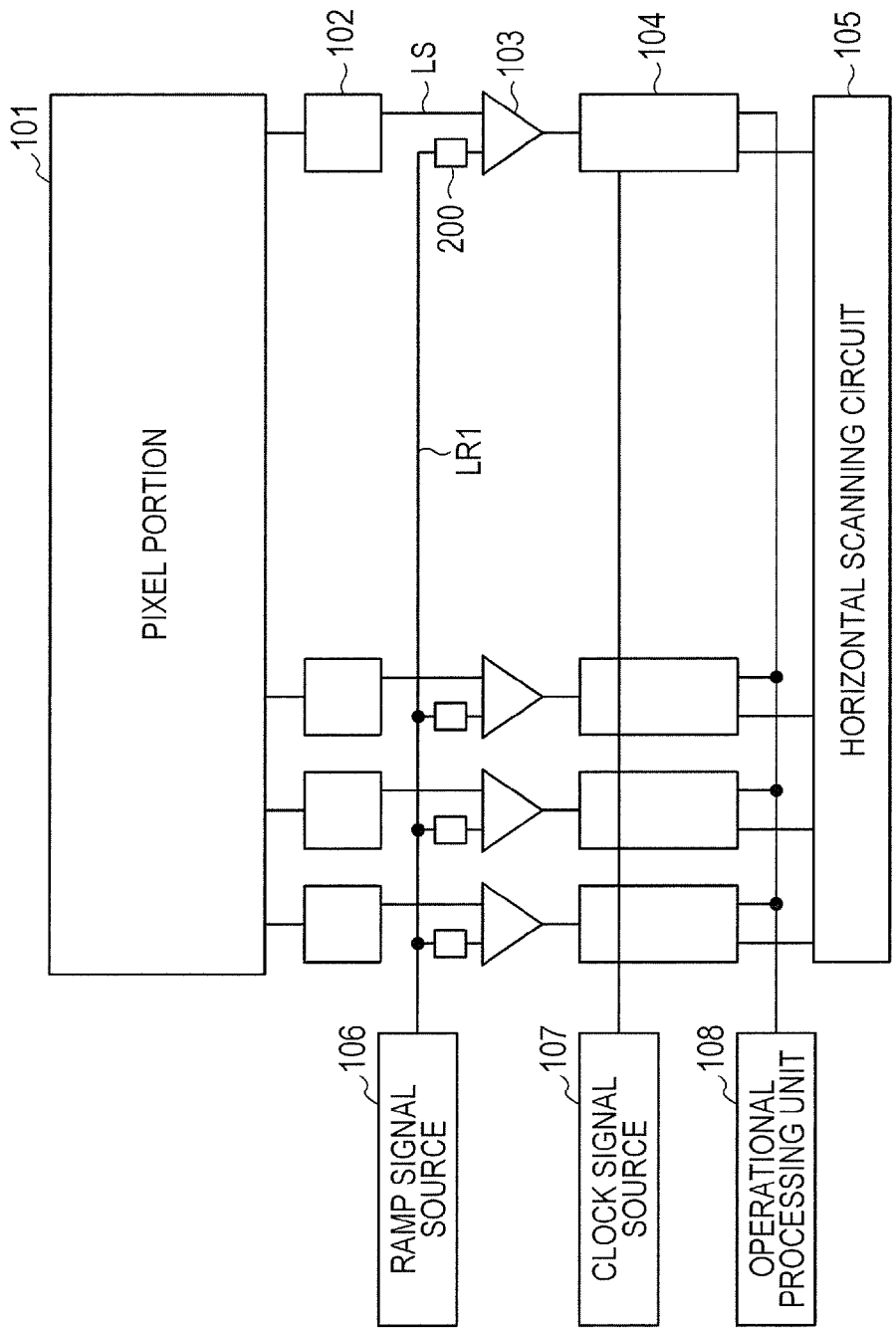

IMAGING APPARATUS HAVING COMPARATOR CONFIGURED TO COMPARE PIXEL SIGNAL WITH REFERENCE SIGNAL THAT CHANGES WITH TIME

BACKGROUND OF THE INVENTION

Field of the Invention

The present invention relates to an imaging apparatus.

Description of the Related Art

A solid imaging apparatus has been known that includes a comparator unit comparing a predetermined level of an analog pixel signal obtained from a pixel with a reference signal that gradually changes for converting the predetermined level into digital data (e.g., see Japanese Patent Application Laid-Open No. 2008-136043). A count unit performs a counting process in parallel with a comparison process in the comparator unit, and holds a count value at the time when the comparison process is ended, thereby acquiring digital data at the predetermined level. A reference signal generating unit changes the slope of the reference signal according to a signal from a communication and timing control unit.

An analog-digital converter has been known that includes a latch circuit for a higher order bit and a latch circuit for a lower order bit, and quantizes the higher order bit and the lower order bit separately from each other (e.g., see Japanese Patent Application Laid-Open No. 2002-232291). First, a pixel signal is supplied to one input terminal of a comparator provided for each column. A staircase wave having a large voltage step is supplied to the other input terminal as a reference voltage. A count value corresponding to the number of steps when the output of the comparator is inverted is held in a latch circuit as a higher order bit. Meanwhile, the reference voltage at this time is held in a capacitor. Subsequently, a reference voltage having a small voltage step is supplied via the capacitor, and a count value at the time when the comparator is inverted again is held in the latch circuit for the lower order bit.

According to Japanese Patent Application Laid-Open No. 2008-136043, the slope of the reference signal changes according to the signal of the communication and timing control unit. Accordingly, there is a possibility that the count value of the count unit on each column has a different value when the slope of the reference signal changes. In this case, it is difficult to design timing between the slope of the reference signal and the count value of the counter unit. When the slope of the reference signal is changed, the clock signal is also required to be changed. Accordingly, the circuit size of the counter unit becomes large.

SUMMARY OF THE INVENTION

An imaging apparatus according to this disclosure includes: a pixel configured to generate a signal through photoelectric conversion; a comparator configured to compare a signal generated by the pixel with a first reference signal that changes with time; and a control unit configured to change a change rate with respect to time of the first reference signal according to a comparison result of the comparator.

Further features of the present invention will become apparent from the following description of exemplary embodiments with reference to the attached drawings.

BRIEF DESCRIPTION OF THE DRAWINGS

FIG. 1 is a diagram illustrating an example of a configuration of an imaging apparatus according to a first embodiment of the present invention.

DESCRIPTION OF THE EMBODIMENTS

Figure 2A:
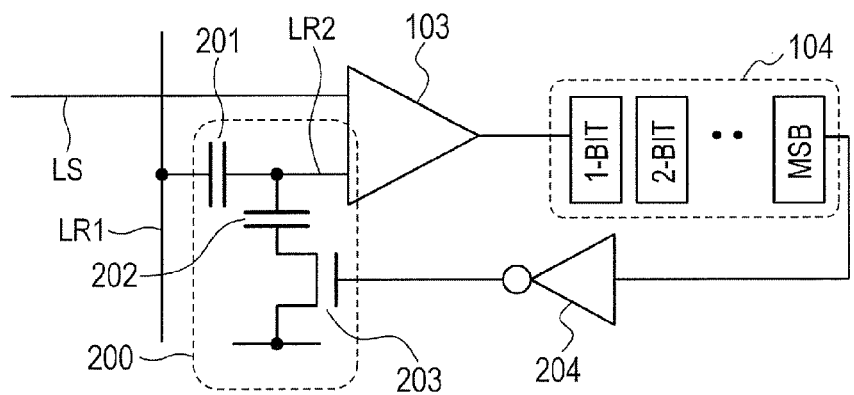
FIGS. 2A and 2B are diagrams illustrating details of parts of the imaging apparatus.

Preferred embodiments of the present invention will now be described in detail in accordance with the accompanying drawings.

First Embodiment

FIG. 1 is a diagram illustrating an example of a configuration of an imaging apparatus according to a first embodiment of the present invention. A pixel portion 101 includes multiple pixels arranged in a two-dimensional matrix. Each pixel generates an analog signal through photoelectric conversion. In the pixel portion 101, pixels are selected in units of rows. The signals of the pixels are output to a readout unit 102 in units of rows. The readout unit 102 is provided for each column of the pixels, and reads the signals of pixels on each column. A ramp signal source (reference signal source) 106 generates a ramp signal (reference signal) LR1 that changes with time. An attenuation circuit 200 is provided for each column of pixels, and attenuates the ramp signal LR1 generated by the ramp signal source 106, and outputs the signal to a comparator 103. The comparator 103 is provided for each column. The comparator 103 on each column compares the output signal LS of the readout unit 102 on each column with the output signal of the attenuation circuit 200 on each column. When the magnitude relationship between the two signals is inverted, the output signal is also inverted. A clock signal source 107 generates a clock signal. A counter 104 is provided for each column of pixels. The counter 104 on each column synchronizes with the clock signal generated by the clock signal source 107. When the ramp signal source 106 starts generating the ramp signal, the counter 104 starts counting. When the output signal of the comparator 103 on each column is inverted, the counter ends counting. A horizontal scanning circuit 105 causes the count values of the counters 104 on the respective columns to be sequentially output to an operational processing unit 108. The operational processing unit 108 computes a digital pixel value corresponding to the magnitude of the pixel signal, based on the count value of each counter 104. This computation thus converts the pixel signal from an analog signal to a digital signal.

Figure 2B:
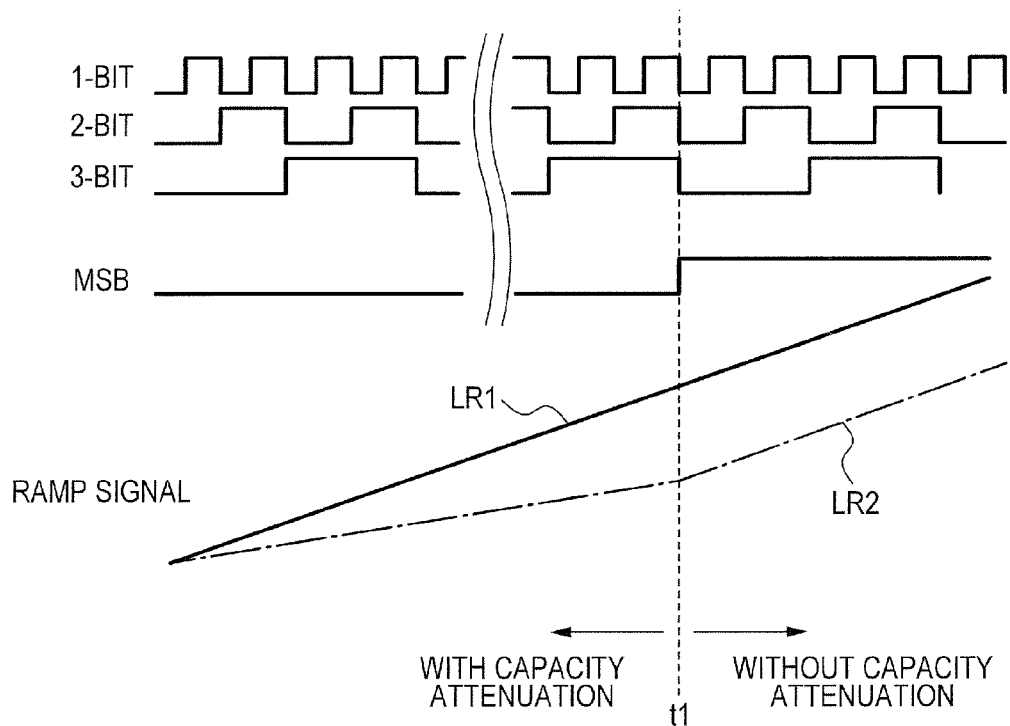

FIG. 2A is a diagram illustrating an example of configurations of a comparator 103, a counter 104, an attenuation circuit 200 and an inverter 204. FIG. 2B is a timing chart for illustrating operation of the imaging apparatus. The attenuation circuit 200 includes capacitors 201 and 202 and an N-channel field-effect transistor 203. A signal LS is a signal of a pixel output from the readout unit 102 (FIG. 1). As illustrated in FIG. 2B, a ramp signal LR1 is a reference signal that is generated by the ramp signal source 106 (FIG. 1) and changes with time. The attenuation circuit 200 attenuates the ramp signal (second reference signal) LR1 according to the output signal of the inverter 204, and outputs a ramp signal (first reference signal) LR2 to the comparator 103. The comparator 103 compares the pixel signal LS with the ramp signal LR2. When the magnitude relationship between both signals is inverted, the output signal (comparison result) is also inverted. The counter 104 counts a count value of multiple bits. As illustrated in FIG. 2B, when the generation of the ramp signal LR1 is started, the counter 104 starts counting, and the count value increases. At the initial state, the count value of the counter 104 is zero, and the most significant bit (MSB) of the count value is also zero. The inverter 204 outputs the logically inverted value of the most significant bit (MSB) in the count value of the counter 104 to the gate of the transistor 203. From the start of counting to time t1, the most significant bit (MSB) of the count value is zero. Accordingly, the inverter 204 outputs one. As a result, the transistor 203 is turned on to connect the attenuation capacitor 202 to the comparator 103. Thus, the attenuation circuit 200 attenuates the ramp signal LR1, and outputs a ramp signal LR2 having a small slope. In contrast, after time t1, the most significant bit (MSB) of the count value is one. Accordingly, the inverter 204 outputs zero. As a result, the transistor 203 is turned off to separate the attenuation capacitor 202. Thus, the attenuation circuit 200 does not attenuate the ramp signal LR1, and outputs a ramp signal LR2 having a large slope. After time t1, the ramp signal LR2 has a larger slope than the slope of the ramp signal LR2 before time t1.

If the output signal of the comparator 103 is inverted before time t1, the pixel signal LS has a relatively low luminance, and a comparison is performed according to the ramp signal LR2 having the small slope before time t1. Accordingly, the comparator 103 can obtain a pixel signal having a high resolution. The output signal of the comparator 103 is inverted before time t1. Accordingly, the count value of the counter 104 is relatively quickly determined.

In contrast, if the output signal of the comparator 103 is inverted after time t1, the pixel signal LS has a relatively high luminance. After time t1, a comparison is performed according to the ramp signal LR2 with the large slope. Change of the slope of the ramp signal LR2 relatively quickly determines the count value of the counter 104. The details are described with reference to FIG. 3.

Figure 3:
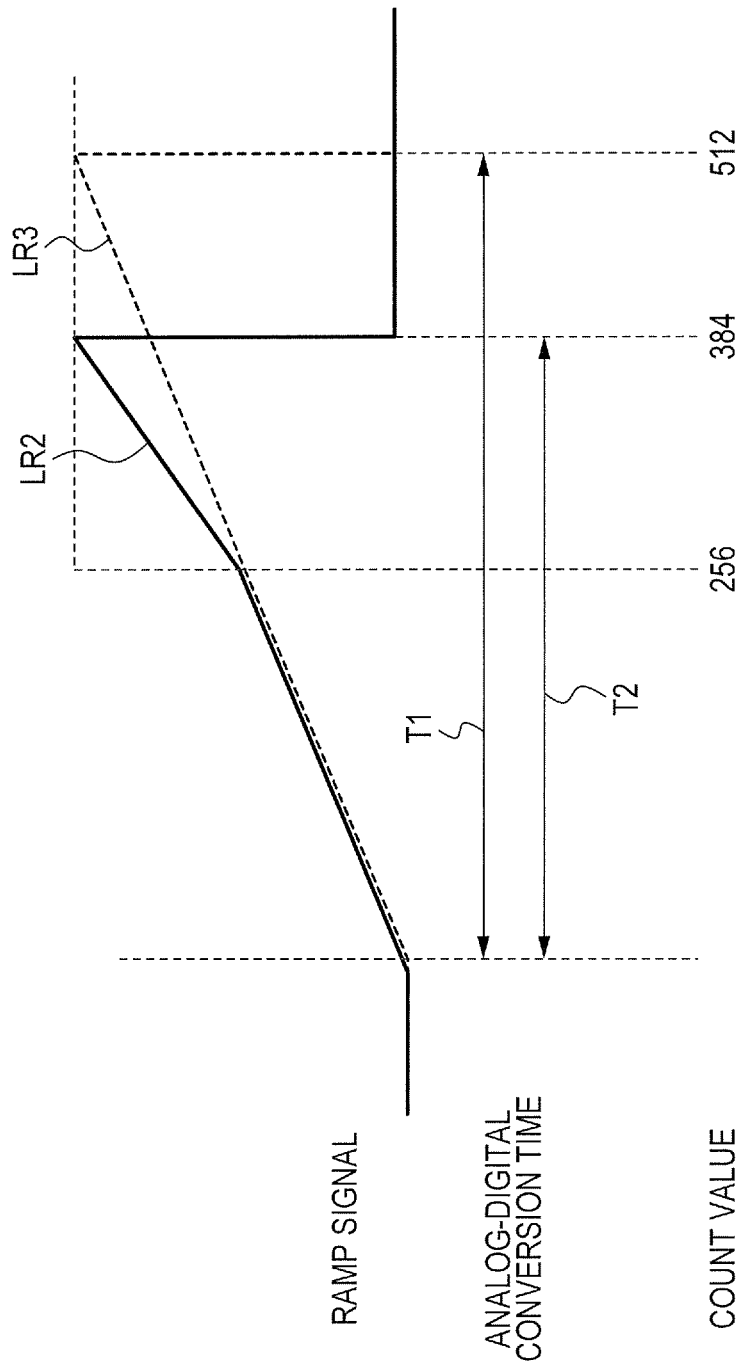
FIG. 3 is a diagram illustrating comparison of a ramp signal.

FIG. 3 is a diagram illustrating a comparison between the ramp signal LR2 whose slope is changed and a ramp signal LR3 having an unchanged slope. For instance, if the pixel signal LS is the maximum value, the ramp signal LR3 with a constant slope has a count value of 512, and the maximum value of the analog-digital converted time is T1. In contrast, according to the ramp signal LR2 of this embodiment, the slope is changed at a count value of 256. The pixel signal LS reaches the maximum value at a count value of 384. The maximum value of the analog-digital converted time is T2. The converted time T2 of this embodiment is shorter than the converted time T1 of the ramp signal LR3. Accordingly, analog-digital conversion can be achieved at high speed.

In FIG. 2B, the ramp signal LR2 after time t1 has a larger slope than the ramp signal LR2 before time t1. Accordingly, a pixel signal with a high luminance has a lower resolution than a pixel signal with a low luminance. However, a variation in the level of the pixel signal with a high luminance is more difficult to be recognized by the human eye than that with a low luminance. Accordingly, adverse effects of a low resolution are small. In contrast, the pixel signal with a low luminance can achieve a higher resolution than the pixel signal with a high luminance. Accordingly, a high resolution can be achieved for the human eye, as a whole.

In FIG. 2B, time t1 when the slope of the ramp signal LR2 is changed, is the time when the most significant bit (MSB) of the count value changes from zero to one. Accordingly, the time has a known value according to the frequency of the clock signal. Therefore, there is no need to change the clock signal at time t1. The operational processing unit 108 (FIG. 1) can easily compute the pixel value. Accordingly, the circuit size can be small.

Next, a method of computing a pixel value of the operational processing unit 108 in FIG. 1 is described. The operational processing unit 108 computes a pixel value DT, based on the bits D[0] to D[MSB] of the count value of the counter 104 according to the following expression.

$$DT = D[MSB] \times 2^{(MSB-1)} + (D[MSB]+1) \times D[MSB-1:0]$$

Here, D[MSB] denotes the most significant bit of the count value. D[MSB−1:0] denotes a count value for the lower order MSB−1 bits. As with the foregoing expression, when the most significant bit D[MSB] is one, the operational processing unit 108 doubles data D[MSB−1:0] for 0 to (MSB−1)-bit, adds $2^{(MSB-1)}$ and outputs the pixel value DT. When the most significant bit D[MSB] is zero, the operational processing unit 108 outputs data D[MSB−1:0] for 0 to (MSB−1)-bit, which is the pixel value DT, as it is.

As described above, this embodiment can achieve analog-digital conversion of pixel signals at high resolution and high speed.

Second Embodiment

Figure 4A:
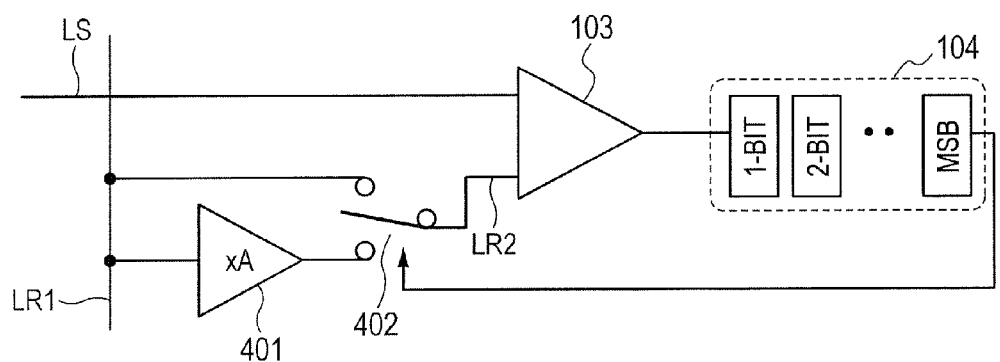
FIGS. 4A and 4B are diagrams illustrating an imaging apparatus according to a second embodiment of the present invention.
Figure 4B:
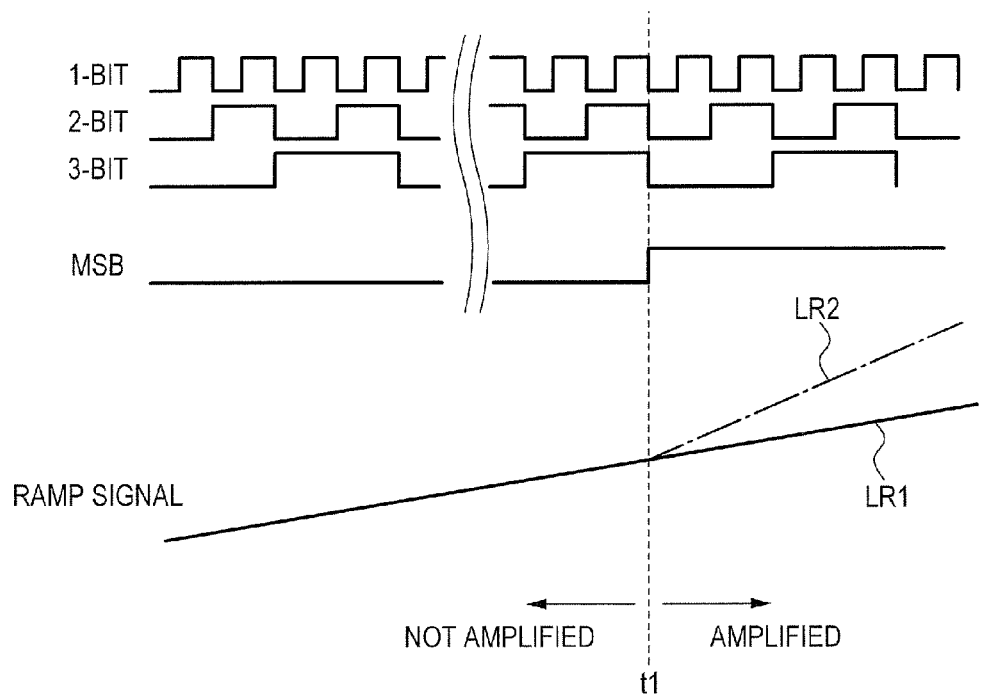

FIG. 4A is a diagram illustrating an example of configurations of a comparator 103, a counter 104, an amplification circuit 401 and a switch 402 according to a second embodiment of the present invention. FIG. 4B is a timing chart for illustrating the operation of an imaging apparatus. This embodiment (FIG. 4A) is a modification of the first embodiment (FIG. 2A) where the amplification circuit 401 and the switch 402 are provided instead of the attenuation circuit 200 and the inverter 204. Aspects of this embodiment different from the aspects of the first embodiment are hereinafter described. The amplification circuit 401 amplifies the ramp signal LR1 and outputs the amplified signal. When the most significant bit (MSB) of the count value of the counter 104 is zero, the switch 402 outputs the ramp signal LR1 as it is without amplification, as a ramp signal LR2, to the comparator 103. In contrast, when the most significant bit (MSB) of the count value of the counter 104 is one, the switch 402 outputs the output signal of the amplification circuit 401 as the ramp signal LR2 to the comparator 103. As illustrated in FIG. 4B, before time t1, the most significant bit (MSB) of the count value is zero. Accordingly, the ramp signal LR2 has a slope identical to the slope of the ramp signal LR1. Meanwhile, after time t1, the most significant bit (MSB) of the count value is one. Accordingly, the ramp signal LR2 has a larger slope than the slope of the ramp signal LR1. According to this embodiment, instead of the attenuation circuit 200, the amplification circuit 401 is used to change the slope of the ramp signal LR2. Other points of this embodiment are analogous to the points of the first embodiment.

The attenuation circuit 200 of the first embodiment and the amplification circuit 401 of the second embodiment are control units that change the change rate (slope) of the ramp signal LR2 with respect to time, according to the count value of the comparison result of the comparator 103.

Third Embodiment

Figure 5:
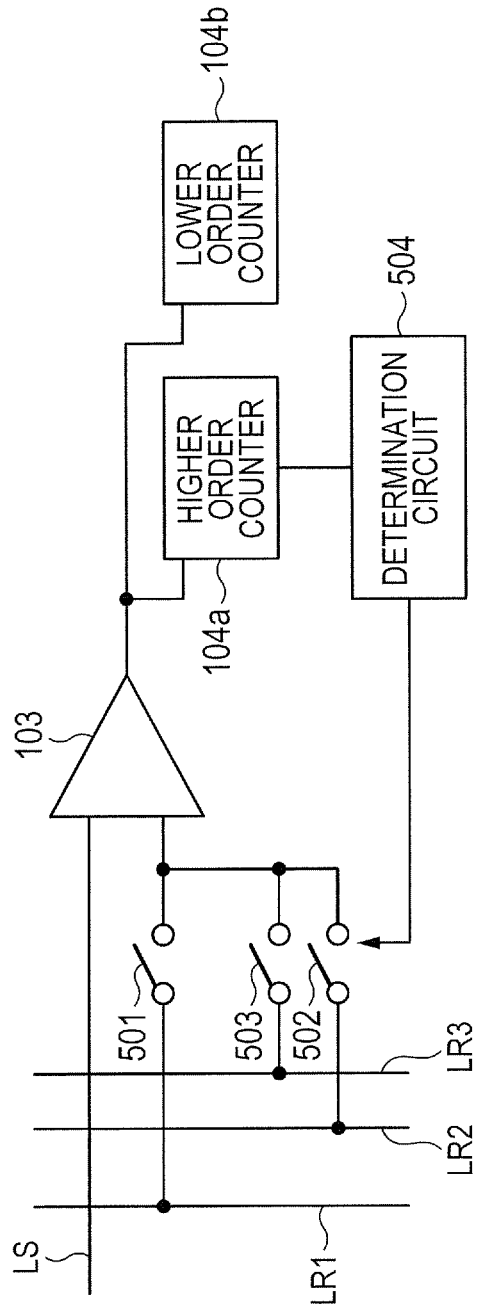
FIG. 5 is a diagram illustrating an example of a configuration of an imaging apparatus according to a third embodiment of the present invention.

FIG. 5 is a diagram of an example of a configuration of an imaging apparatus of a third embodiment of the present invention. This embodiment (FIG. 5) is a modification of the first embodiment (FIG. 2A) where switches 501 to 503 and a determination circuit 504 are provided instead of the attenuation circuit 200 and the inverter 204. A higher order counter 104a and a lower order counter 104b in FIG. 5 correspond to the counter 104 in FIG. 2A. The higher order counter 104a counts a count value for its higher order bits. The lower order counter 104b counts a count value for its lower order bits. Points of this embodiment different from the points of the first embodiment are hereinafter described.

Figure 6A:
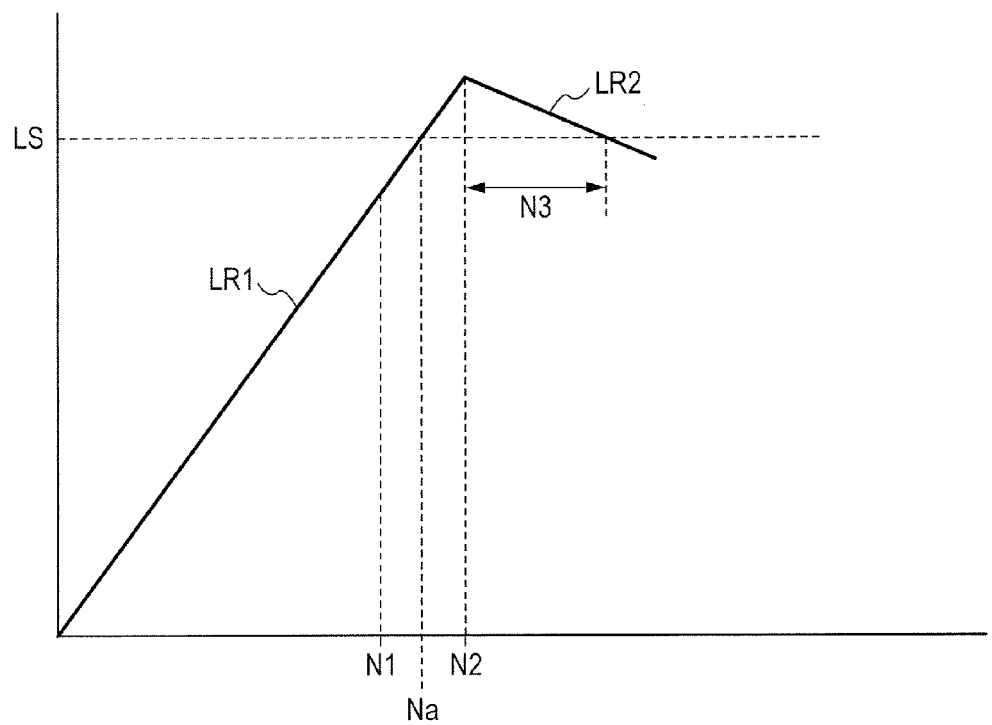
FIGS. 6A and 6B are diagrams for illustrating operation of the imaging apparatus.

FIG. 6A is a diagram for illustrating operation of the imaging apparatus. The abscissa axis indicates the count values (time) of the counters 104a and 104b. The ordinate axis indicates a pixel signal LS and ramp signals LR1 and LR2. First, the switch 501 is turned on, and the switches 502 and 503 are turned off. The ramp signal LR1 is then input into a comparator 103. The higher order counter 104a starts counting up from an initial value of zero. The comparator 103 compares the pixel signal LS with the ramp signal LR1. The ramp signal LR1 increases with time. After a while, the ramp signal LR1 becomes larger than the pixel signal LS. The magnitude relationship is inverted. The output signal of the comparator 103 is then inverted, and the higher order counter 104a ends counting. The count value of the higher order counter 104a at this time is N2. The higher order counter 104a is for counting a count value for the higher order bits corresponding to the ramp signal LR1 having a large slope. Accordingly, the quantization step is large, and the count value before the count value N2 is N1. A true count value Na where the ramp signal LR1 coincides with the pixel signal LS therefore resides between the count values N1 and N2 of the higher order counter 104a.

Subsequently, the switches 501 and 503 are turned off, and the switch 502 is turned on. The ramp signal LR2 is then input into the comparator 103, and the lower order counter 104b starts counting. The comparator 103 compares the pixel signal LS with the ramp signal LR2. The ramp signal LR2 has a smaller absolute value of a slope than the ramp signal LR1 has, and decreases after continuation of the ramp signal LR1 with time. After a while, the ramp signal LR2 becomes smaller than the pixel signal LS, and the magnitude relationship is inverted. The output signal of the comparator 103 is then inverted, and the lower order counter 104b ends counting. The count value of the lower order counter 104b at this time is N3. The lower order counter 104b is for counting a count value of the lower order bits corresponding to the ramp signal LR2 having a small absolute value of the slope. Accordingly, the quantization step is small. The true count value Na of the pixel signal LS can thus be obtained as the pixel value by subtracting the lower order count value N3 of the lower order counter 104b from the higher order count value N2 of the higher order counter 104a. The count value N2 is higher order bits of the count value, and the count value N3 is lower order bits of the count value. Accordingly, the lower order count value N3 is subtracted from a left-shifted higher order count value N2.

Figure 7A:
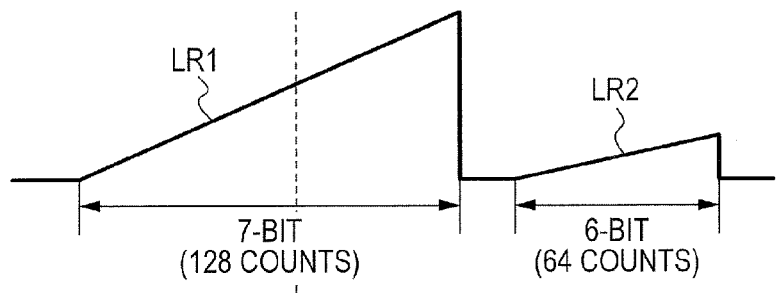
FIGS. 7A and 7B are diagrams illustrating ramp signals.
Figure 7B:
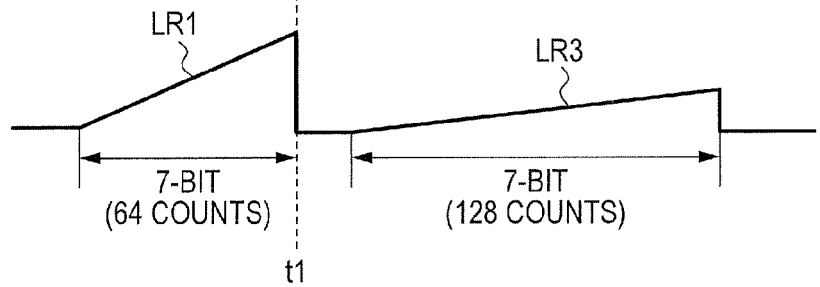

FIG. 7A illustrates a ramp signal for a pixel signal LS with a high luminance. FIG. 7B illustrates a ramp signal for a pixel signal LS with a low luminance. In FIGS. 7A and 7B, the ramp signals LR1, LR2 and LR3 are illustrated so as to have the same positive/negative sign with respect to each other. As described above, irrespective of the magnitude of the pixel signal LS, the switch 501 is initially turned on, the switches 502 and 503 are turned off, the ramp signal LR1 is input into the comparator 103, and the higher order counter 104a starts counting. The comparator 103 compares the pixel signal LS with the ramp signal LR1.

Here, as illustrated in FIG. 7A, if the pixel signal LS has a high luminance, the magnitude relationship between the ramp signal LR1 and the pixel signal LS is inverted after time t1 when the most significant bit of the count value of the higher order counter 104a changes from zero to one and then the counting by the higher order counter 104a is ended. In this case, the most significant bit of the count value of the higher order counter 104a is one. If the higher order bit 104a is a seven-bit counter, the maximum value of the count value of the higher order bit 104a is 128. That is, counting by the higher order counter 104a is ended by the count value of 128 being reached. If the most significant bit of the count value of the higher order counter 104a is one after counting by the higher order counter 104a, the determination circuit 504 turns off the switches 501 and 503 and turns on the switch 502. The ramp signal LR2 is then input into the comparator 103, and counting of the lower order counter 104b is started. The comparator 103 compares the pixel signal LS with the ramp signal LR2. The ramp signal LR2 has a smaller absolute value of a slope than the ramp signal LR1 has. After a while, the magnitude relationship between the ramp signal LR2 and the pixel signal LS is inverted, and counting of the lower order counter 104b is ended. The count value of the lower order counter 104b corresponds to the slope of the ramp signal LR2. For instance, counting of a 6-bit count value (the maximum value is 64) is performed. In this case, by a count value of 64 being reached, counting by the lower order counter 104b is ended. Subsequently, as described above, the pixel value is obtained based on the count values of the higher order counter 104a and the lower order counter 104b.

In contrast, as illustrated in FIG. 7B, if the pixel signal LS has a low luminance, before time t1 when the most significant bit of the count value of the higher order counter 104a is changed from zero to one, the magnitude relationship between the ramp signal LR1 and the pixel signal LS is inverted. Counting by higher order counter 104a is then ended. In this case, the most significant bit of the count value of the higher order counter 104a is zero. By a count value of 64 being reached, counting by the higher order counter 104a is ended. After counting by the higher order counter 104a is ended, if the most significant bit of the count value of the higher order counter 104a is zero, the determination circuit 504 turns off the switches 501 and 502 and turns on the switch 503. The ramp signal LR3 is then input into the comparator 103, and counting by the lower order counter 104b is started. The comparator 103 compares the pixel signal LS with the ramp signal LR3. The ramp signal LR3 has a smaller absolute value of a slope than the ramp signal LR2 has. After a while, the magnitude relationship between the ramp signal LR3 and the pixel signal LS is inverted, and counting by the lower order counter 104b is ended. The count value of the lower order counter 104b corresponds to the slope of the ramp signal LR3. For instance, counting of the 7-bit count value (the maximum value is 128) is performed. In this case, by a count value of 128 being reached, counting by the lower order counter 104b is ended. Subsequently, as described above, the pixel value is obtained based on the count values of the higher order counter 104a and the lower order counter 104b.

In the case in FIG. 7A, the maximum value of the analog-digital converted time is 128+64=192, which is the sum of a count value by the higher order counter 104a of 128 and a count value by the lower order counter 104b of 64. Meanwhile, in the case in FIG. 7B, the maximum value of the analog-digital converted time is 64+128=192, which is the sum of a count value by the higher order counter 104a of 64 and a count value by the lower order counter 104b of 128. This sum is identical to the sum in the case in FIG. 7A.

The ramp signal LR2 in FIG. 7A has a larger absolute value of the slope than the ramp signal LR3 in FIG. 7B has. Accordingly, if the pixel signal LS has a high luminance, the analog-digital converted time can be shortened. The ramp signal LR3 in FIG. 7B has a smaller absolute value of the slope than the ramp signal LR2 in FIG. 7A has. Accordingly, if the pixel signal LS has a low luminance, the resolution of the count value can be high.

The ramp signal LR2 in FIG. 7A has a higher absolute value of the slope than the ramp signal LR3 in FIG. 7B has. The pixel signal with a high luminance has a lower resolution than the pixel signal with a low luminance has. However, variation in level of the pixel signal with a high luminance is more difficult to be recognized by the human eye than that of the pixel signal with a low luminance. Accordingly, the adverse effects are small even with a low resolution. Meanwhile, the pixel signal with a low luminance can achieve a higher resolution than the pixel signal with a high luminance do. Thus, a high resolution can be achieved for the human eye as a whole.

The higher order counter 104a is a first counter that counts the count value before the slope of the ramp signal is changed and until the output signal of the comparator 103 is inverted. The lower order counter 104b is a second counter that counts the count value after the slope of the ramp signal is changed and until the output signal of the comparator 103 is inverted. The switches 501 to 503 are a control unit that changes the slope of the ramp signal according to the count value of the higher order counter 104a. More specifically, if the count value by the higher order counter 104a is higher than a threshold, the switches (control unit) 501 to 503 change the signal to the ramp signal LR2. If the count value by the higher order counter 104a is smaller than the threshold, the switches change the signal to the ramp signal LR3. Provided that the change rate of the ramp signal LR2 with respect to time is a first change rate and the change rate of the ramp signal LR3 with respect to time is a second change rate, the absolute value of the second change rate is smaller than the absolute value of the first change rate.

Figure 8:
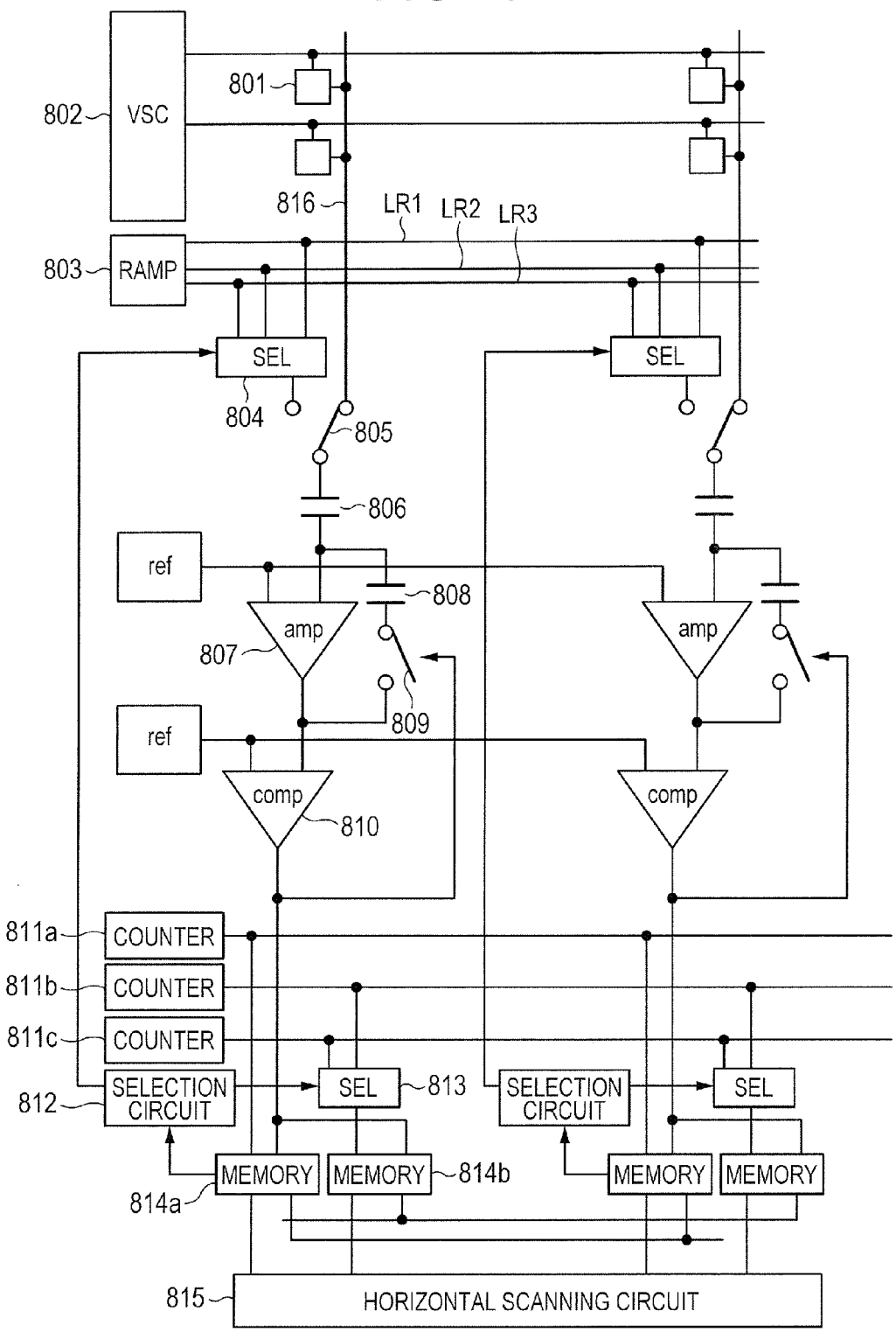
FIG. 8 is a diagram illustrating an example of a configuration of an imaging apparatus according to the third embodiment of the present invention.

FIG. 8 is a diagram illustrating an example of a configuration of an image apparatus according to this embodiment. Pixels 801 correspond to the pixel portion 101 in FIG. 1, and are arranged in two-dimensional matrix, and generate analog signals through photoelectric conversion. A signal line 816 is arranged for each column of the pixels 801. The vertical scanning circuit 802 controls the pixels 801 in units of rows, and sequentially outputs signals of the pixels 801 on each row to the signal line 816. The ramp signal source 803 generates the three ramp signals LR1, LR2 and LR3. A selector 804 corresponds to the switches 501 to 503 in FIG. 5. This selector selects one of the ramp signals LR1 to LR3 according to a selection signal of the selection circuit 812, and outputs the signal. A switch 805 selects the output signal of the selector 804 or the signal of the signal line 816, and outputs the signal to a differential amplifier 807 via a capacitor 806. The differential amplifier 807 receives the signal of the capacitor 806 and the reference value ref, and outputs an amplified signal. A linear-connected circuit of a feedback capacitor 808 and a feedback switch 809 are connected between the input terminal and the output terminal of the differential amplifier 807. A comparator 810 corresponds to the comparator 103 in FIG. 5, and compares the output signal of the differential amplifier 807 with the reference value ref. When the magnitude relationship between both signals is inverted, the output signal is also inverted and the feedback switch 809 is controlled. A higher order counter 811a corresponds to the higher order counter 104a in FIG. 5, and starts counting upon start of generation of the ramp signal LR1. A lower order counter 811b corresponds to the lower order counter 104b in FIG. 5, and starts counting upon start of generation of the ramp signal LR2. A lower order counter 811c corresponds to the lower order counter 104b in FIG. 5, and starts counting upon start of generation of the ramp signal LR3.

When inversion of the magnitude relationship between the ramp signal LR1 and the pixel signal LS inverts the output signal of the comparator 810, a memory 814a latches and holds the count value of the higher order counter 811a. While the ramp signal LR2 is selected by the selection circuit 812, a selector 813 selects the count value of the lower order counter 811b. While the ramp signal LR3 is selected by the selection circuit 812, the count value of the lower order counter 811c is selected and output. When inversion of the magnitude relationship between the ramp signal LR2 or LR3 and the pixel signal LS inverts the output signal of the comparator 810, the memory 814b latches and holds the count value output from the selector 813. A horizontal scanning circuit 815 sequentially outputs the count values in memories 814a and 814b on each column as output signals, and pixel values are computed by the operational processing unit 108 (FIG. 1).

Figure 6B:
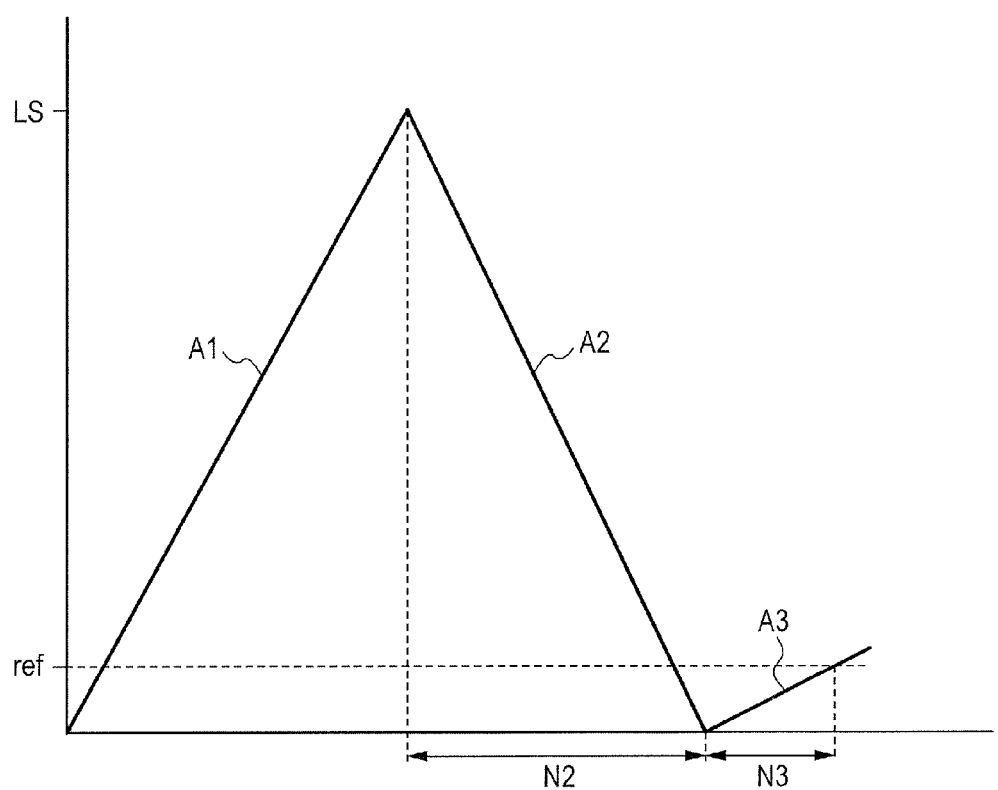

FIG. 6B is a diagram illustrating output signals of the differential amplifier 807 in FIG. 8. First, the switch 805 connects the capacitor 806 to the signal line 816. The differential amplifier 807 then outputs a signal A1, which is obtained by integrating the signal of the pixel 801. The signal A1 reaches a pixel signal LS after a while.

Next, the ramp signal source 803 generates the ramp signal LR1. The selector 804 selects the ramp signal LR1. The switch 805 connects the output signal of the selector 804 to the capacitor 806. The higher order counter 811a starts counting. The differential amplifier 807 then outputs a signal A2, which is obtained by subtracting the ramp signal LR1 from the pixel signal LS. Inversion of the magnitude relationship between the signal A2 and the reference value ref, in turn, inverts the output signal of the comparator 810. The memory 814a then latches the count value N2 of the higher order counter 811a.

Next, when the most significant bit of the count value N2 held in the memory 814a is one, the selection circuit 812 outputs the selection signal of the ramp signal LR2, as illustrated in FIG. 7A. In this case, the ramp signal source 803 generates the ramp signal LR2. The selector 804 selects the ramp signal LR2. The switch 805 connects the output signal of the selector 804 to the capacitor 806. The lower order counter 811b starts counting. The selector 813 then selects the count value of the lower order counter 811b.

In contrast, while the most significant bit of the count value N2 held in the memory 814a is zero, the selection circuit 812 outputs the selection signal of the ramp signal LR3 as illustrated in FIG. 7B. In this case, the ramp signal source 803 generates the ramp signal LR3. The selector 804 selects the ramp signal LR3. The switch 805 connects the output signal of the selector 804 to the capacitor 806. The lower order counter 811c starts counting. The selector 813 then selects the count value of the lower order counter 811c.

The differential amplifier 807 then outputs, subsequent to the signal A2, the signal A3 obtained by adding the ramp signal LR2 or LR3 thereto. Inversion of the magnitude relationship between the signal A3 and the reference value ref, in turn, inverts the output signal of the comparator 810. The memory 814b then latches the count value N3 output from the selector 813. Subsequently, the operational processing unit 108 (FIG. 1) computes the pixel value, based on the count values N2 and N3.

The case where the counters 811a, 811b and 811c are common to each column has thus been exemplified. Alternatively, counters 811a, 811b and 811c may be provided for each column.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-167499, filed Aug. 12, 2013, which is hereby incorporated by reference herein in its entirety.

What is claimed is:

1. An imaging apparatus, comprising:
a pixel configured to output a signal;
a counter that counts a count value;
a comparator configured to perform a comparison of the signal with a reference signal; and
a control circuit,
wherein
the comparator performs the comparison by using the reference signal which changes with a first rate in a first period until the count value reaches a predetermined value,
the control circuit changes a change rate from the first rate to a second rate larger than the first rate in response to the count value reaching the predetermined value, and
the comparator further performs the comparison using the reference signal which changes with the second rate in a second period in which the count value is changing, in the case where the control circuit changes the change rate to the second rate.

2. The imaging apparatus according to claim 1, further comprising
a reference signal generating circuit that generates the reference signal having the first rate and the reference signal having the second rate,
wherein the control circuit generates one of the reference signal having the first rate and the reference signal having the second rate, based on the other one of the reference signal having the first rate and the reference signal having the second rate.

3. The imaging apparatus according to claim 2, wherein the control circuit comprises an attenuation circuit that generates the reference signal having the first rate by attenuating the reference signal having the second rate.

4. The imaging apparatus according to claim 2, wherein the control circuit comprises an amplification circuit that generates the reference signal having the second rate by amplifying the reference signal having the first rate.

5. The imaging apparatus according to claim wherein the comparator outputs a comparison result,
and the counter counts the count value until the comparison result is changed.

6. The imaging apparatus according to claim 5, further comprising an operational processing circuit that computes a pixel value according to the count value of the counter before the change rate of the reference signal is changed from the first rate to the second rate, and computes the pixel value according to the count value of the counter after the change rate of the reference signal is changed from the first rate to the second rate.

7. The imaging apparatus according to claim 1, wherein the comparator outputs a comparison result, and
the counter includes:
a first counter that counts a count value until the comparison result is changed before the change rate of the reference signal is changed; and
a second counter that counts a count value until the comparison result is changed after the change rate of the reference signal is changed from the first rate to the second rate, and
the control circuit changes the change rate of the reference signal from the first rate to the second rate according to the count value of the first counter.

8. An imaging apparatus, comprising:
a pixel configured to generate a signal through photoelectric conversion;
a comparator configured to compare a signal generated by the pixel with a first reference signal that changes with time;
a control circuit that changes a change rate of the first reference signal with respect to time according to a comparison result of the comparator;
a first counter configured to count a count value until an output signal of the comparator is inverted before the change rate of the first reference signal with respect to time is changed; and
a second counter configured to count a count value until the output signal of the comparator is inverted after the change rate of the first reference signal with respect to time is changed,
wherein when the count value of the first counter becomes larger than a threshold, the control circuit changes the change rate of the first reference signal to a first change rate, and when the count value of the first counter becomes smaller than the threshold, the control circuit changes the change rate of the first reference signal to a second change rate where an absolute value of the second change rate is smaller than an absolute value of the first change rate.

9. An imaging apparatus, comprising:
a pixel configured to output a signal;
a comparator configured to compare a signal generated by the pixel with a first reference signal that changes with time;
a counter configured to output a count value corresponding to an elapsed time from a start of comparing the signal generated by the pixel with the first reference signal;
a detecting circuit that detects the count value reaching a predetermined value that is not a maximum value of the count value; and
a control circuit configured to control a change rate of the first reference signal with respect to time to a first change rate when the count value is less than the predetermined value and control the change rate to a second change rate different from the first change rate when the count value is not less than the predetermined value.

10. The imaging apparatus according to claim 9, further comprising a reference signal generating circuit that generates a second reference signal that changes with time, wherein the control circuit generates the first reference signal, based on the second reference signal.

11. The imaging apparatus according to claim 10, wherein the control circuit comprises an attenuation circuit that generates the first reference signal by attenuating the second reference signal.

12. The imaging apparatus according to claim 10, wherein the control circuit comprises an amplification circuit that generates the first reference signal by amplifying the second reference signal.

13. The imaging apparatus according to claim 9, further comprising an operational processing circuit that computes a pixel value according to the count value of the counter when the change rate is changed to the second change rate and the count value of the counter when an output signal of the comparator is inverted according to a comparison result of the comparator.

14. The imaging apparatus according to claim 9, wherein the counter outputs:

a first count value corresponding to an elapsed time until an output signal of the comparator is inverted when the change rate is the first change rate, and a second count value corresponding to an elapsed time until the output signal of the comparator is inverted when the change rate is the second change rate, wherein the control circuit sets the second change rate according to the first count value.

15. The imaging apparatus according to claim 14, wherein the counter includes:

a higher order counter outputting a higher order count value indicated by higher order bits of the count value, and a lower order counter outputting a lower order count value indicated by lower order bits of the count value, wherein the first count value is the higher order count value output by the higher order counter, and wherein the second count value is the lower order count value output by the lower order counter.

16. The imaging apparatus according to claim 15, wherein the count value is indicated by an N-bit value, when the first count value is larger than a threshold, the first count value is indicated by an M-bit value and the second count value is indicated by an (N−M)-bit value, and when the first count value is smaller than the threshold, the first count value is indicated by an (M−1)-bit value and the second count value is indicated by an (N−M+1)-bit value.

17. The imaging apparatus according to claim 9, wherein the control circuit changes the change rate according to a value of a most significant bit of the count value.

* * * * *